(12) United States Patent
Riedl et al.

(10) Patent No.: US 8,413,181 B2
(45) Date of Patent: Apr. 2, 2013

(54) SYSTEM AND METHOD FOR SELECTING AND DELIVERING ADS BASED ON CROSS-PLATFORM ACTIVITY

(75) Inventors: Steve Riedl, Superior, CO (US); Bryan Santangelo, Sand Springs, OK (US); Gabe Zimbelman, Arvada, CO (US)

(73) Assignee: Time Warner Cable, Inc., New York, NY (US)

( * ) Notice: Subject to any disclaimer, the term of this patent is extended or adjusted under 35 U.S.C. 154(b) by 921 days.

(21) Appl. No.: 11/955,758

(22) Filed: Dec. 13, 2007

(65) Prior Publication Data
US 2009/0158320 A1  Jun. 18, 2009

(51) Int. Cl.
*H04N 7/10* (2006.01)
*H04N 7/025* (2006.01)

(52) U.S. Cl. .......................................................... 725/32

(58) Field of Classification Search ............... 725/32–36
See application file for complete search history.

(56) References Cited

U.S. PATENT DOCUMENTS

| | | | |
|---|---|---|---|
| 5,260,778 A | 11/1993 | Kauffman et al. | |
| 5,515,098 A | 5/1996 | Carles | |
| 6,002,393 A | 12/1999 | Hite et al. | |
| 6,006,257 A | 12/1999 | Slezak | |
| 6,029,045 A | 2/2000 | Picco et al. | |
| 6,133,912 A | 10/2000 | Montero | |
| 6,169,542 B1 | 1/2001 | Hooks et al. | |
| 6,357,042 B2 | 3/2002 | Srinivasan et al. | |
| 6,411,725 B1 | 6/2002 | Rhoads | |
| 6,411,992 B1 | 6/2002 | Srinivasan et al. | |
| 6,526,577 B1 | 2/2003 | Knudson et al. | |
| 6,574,795 B1 | 6/2003 | Carr | |
| 6,611,842 B1 | 8/2003 | Brown | |
| 6,698,020 B1 | 2/2004 | Zigmond et al. | |
| 6,718,551 B1 | 4/2004 | Swix et al. | |
| 7,111,314 B2 | 9/2006 | Urdang et al. | |
| 2002/0059094 A1* | 5/2002 | Hosea et al. | 705/10 |
| 2002/0078440 A1 | 6/2002 | Feinberg et al. | |
| 2005/0015816 A1 | 1/2005 | Christofalo et al. | |
| 2006/0161952 A1* | 7/2006 | Herz et al. | 725/46 |
| 2007/0094042 A1* | 4/2007 | Ramer et al. | 705/1 |
| 2007/0256015 A1 | 11/2007 | Matz | |
| 2007/0283384 A1* | 12/2007 | Haeuser et al. | 725/34 |
| 2009/0049469 A1* | 2/2009 | Small et al. | 725/35 |
| 2009/0217318 A1 | 8/2009 | VerSteeg et al. | |
| 2010/0095323 A1 | 4/2010 | Williamson et al. | |
| 2010/0172625 A1 | 7/2010 | Lee et al. | |

FOREIGN PATENT DOCUMENTS

WO  WO 9966719 A1  12/1999

OTHER PUBLICATIONS

"Introduction to Service Provider Video Service Technologies, Architectures, and Standards," 2006, Cisco Systems, Inc.

* cited by examiner

*Primary Examiner* — Bennett Ingvoldstad
(74) *Attorney, Agent, or Firm* — The Marbury Law Group, PLLC

(57) ABSTRACT

A cross-platform advertising system utilizes viewing data, browsing data, and telephone call data to establish subscriber account profile and, optionally, user profiles for users at the subscriber account. An ad selection processor selects ads based on subscriber account profile and, optionally, the user profile. An ad delivery processor delivers the selected ads to a device associated with the subscriber account.

33 Claims, 2 Drawing Sheets

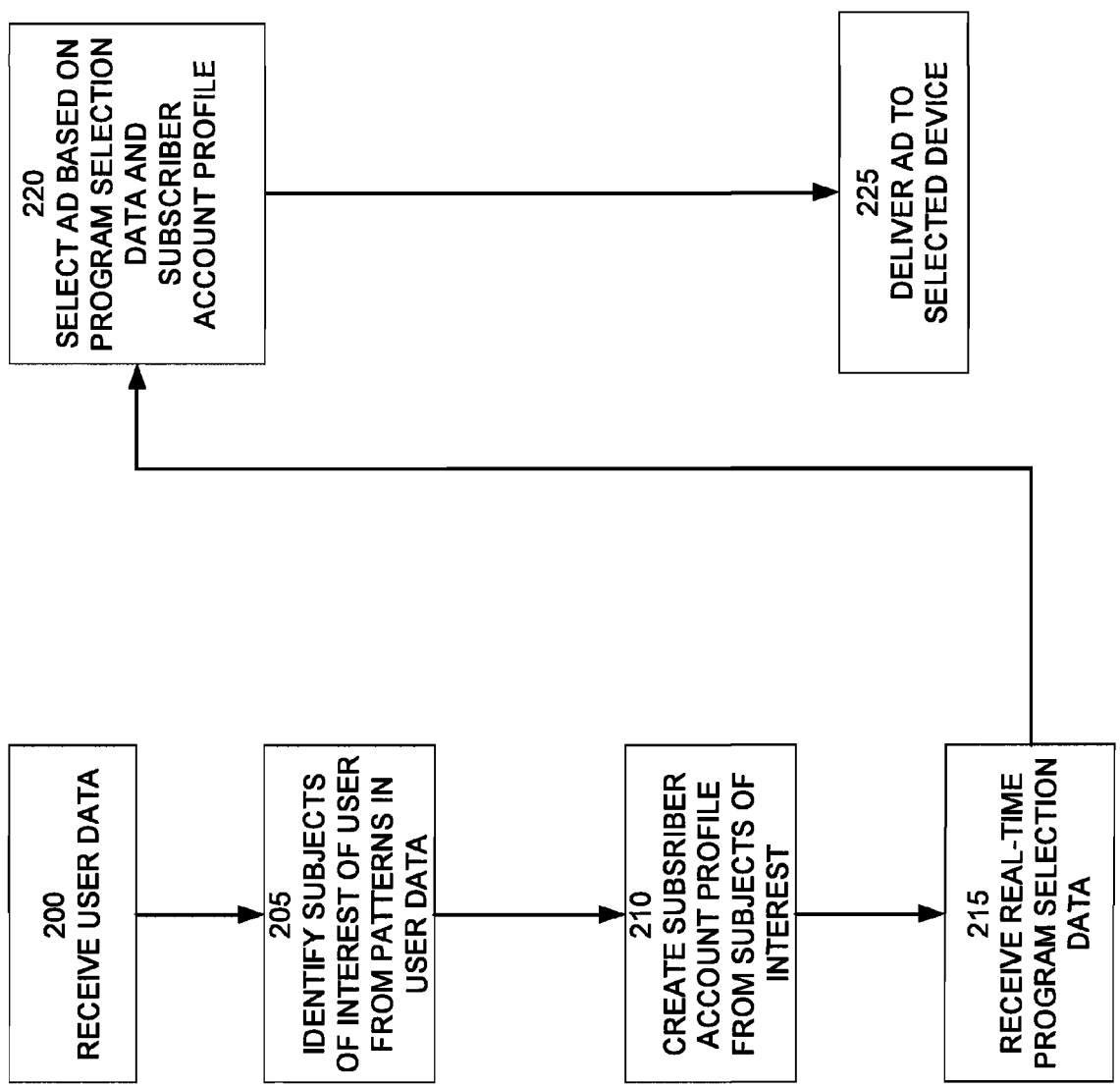

SYSTEM AND METHOD FOR SELECTING AND DELIVERING ADS BASED ON CROSS-PLATFORM ACTIVITY

BACKGROUND AND SUMMARY

Historically, Internet services, telephone services, and television programming services have been provided by different service providers. The revenue model of each of these service providers was service specific.

With the increasing use of digital technologies to provide telephone, high speed data and television programming services, the distinctions between the services have blurred. For example, a cable system operator may provide all three services over a largely digital pipe.

A major source of revenue for cable system operators is the sale of television advertising time, both locally and nationally. The price of an advertisement slot is based on the popularity of the programming in which that slot is provided.

Advertisers have typically attempted to maximize the return on their advertising investment by targeting specific viewer segments that are likely to be most receptive to the commercial message embodied in the advertisements. One of the most widespread and simplest ways of targeting viewers involves identifying what types of viewers most commonly view specific television programs. For example, it may be found that sports programming is viewed by a segment of the population that includes a large group of persons who are likely to purchase automobiles. In another example, it may be found that a news program is viewed most frequently by persons who are more interested in investment services than the public at large.

Advertisers offering goods or services that coincide with the interests of the viewers of a particular program are usually willing to pay a premium for advertising time associated with that program. Accordingly, broadcasters have a financial incentive to provide programming that is easily associated with specific segments of the viewing population and to facilitate the identification of the profiles of viewers.

Another method of targeting specific viewing audiences involves selecting advertisements according to the geographical region in which they are to be broadcast. Frequently, viewers in one local or regional area may be more likely to be receptive to an advertiser's message than viewers in a different area. For example, some advertisements are presented by businesses operating in a limited geographical area. Accordingly, advertising success and the advertising revenues received by broadcasters can be maximized when different advertisements may be broadcast to different geographical areas.

However, even with the widespread practice of targeting viewers based on television programming content and the practice of geographically differentiating advertisements, viewers who are likely to be disinterested in the goods or services offered by advertisers unavoidably constitute a large percentage of the viewing population. For example, even though it may be found that viewers of sports programming are collectively more likely to purchase automobiles, a large number of individual viewers in this segment of the viewing population simply are not interested in such purchases. Likewise, while viewers of news programs may be more interested as a whole in investment services than the general public, a large number of such viewers belong to age or economic segments of the population that traditionally do not make use of investment services. In view of these and many other examples, conventional methods and systems for targeting advertisements to specific groups of viewers are inefficient.

Profiling viewers based on viewing habits may improve the likelihood that a viewer is interested in a particular product or service. However, viewing data alone may not be the best indicator of a viewer's current interests or needs.

The cable industry is rapidly embracing "cross-platform services." A cross-platform service utilizes a feature provided on one platform (such as voice) to offer a feature on another platform (such as video). Thus, displaying caller ID information on a video display is a cross-platform service—a voice element crossed to a video service. Another example is the programming of a DVR via a web page—a data element crossed to a video service.

Providing data, voice and video services to subscribers has its challenges. For example, billing systems must accommodate differing revenue models and customer services departments must be trained to handle customer support issues across a wide range of devices. However, the provision of services over differing platforms also provides a cable system operator with a wealth of information regarding the interests of subscribers. In an embodiment, subscriber viewing data is correlated with Internet browsing data and/or telephone calling data to produce a subscriber account profile that is used to select advertisements targeted to devices associated with a subscriber account. In another embodiment, e-mail configuration data is used to refine the subscriber account profile to create user profiles.

DESCRIPTION OF THE DRAWINGS

FIG. 2 illustrates a process using a cross-platform advertisement delivery system according to an embodiment hereof.

DETAILED DESCRIPTION

Figure 1:
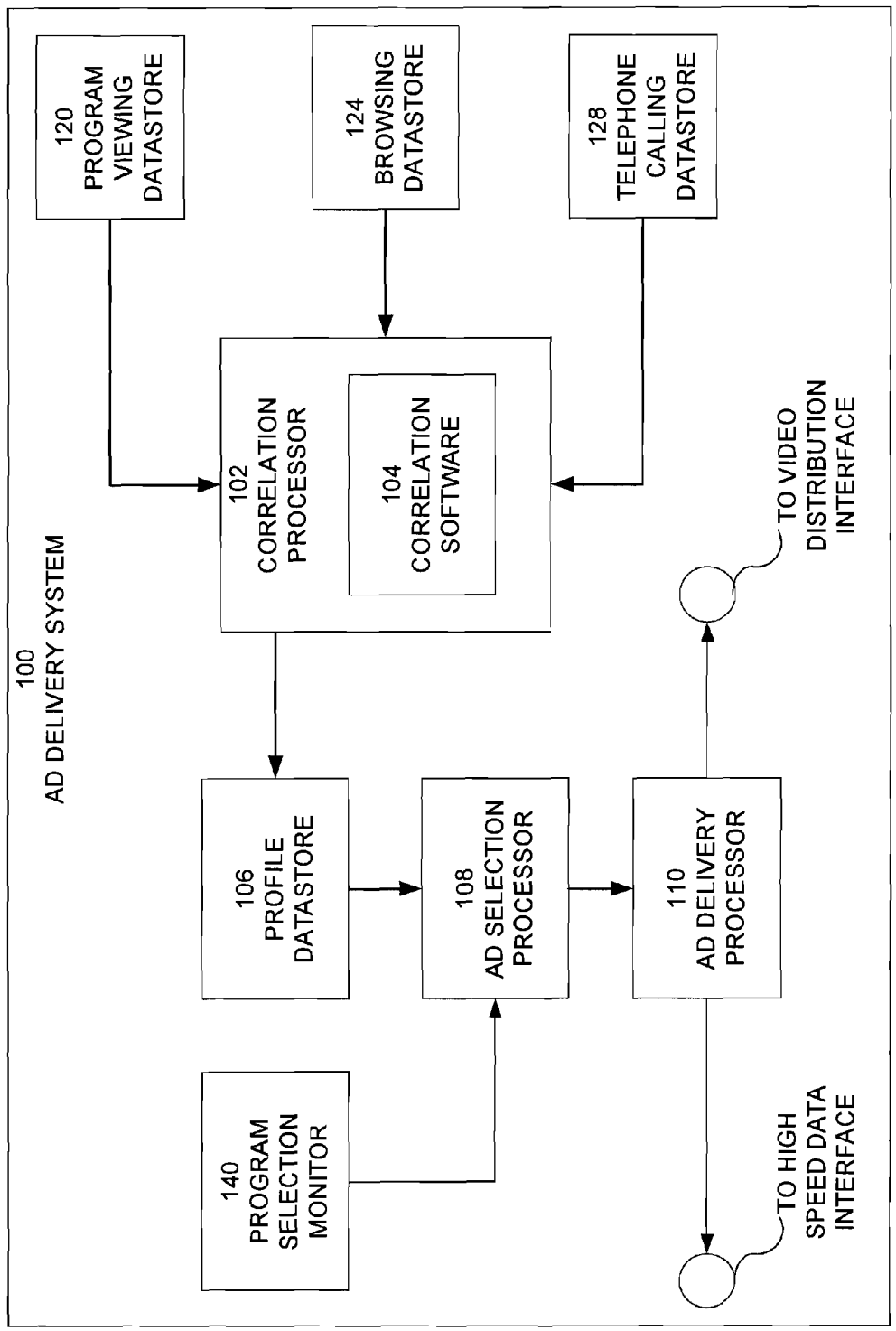
FIG. 1 illustrates an advertising system according to an embodiment hereof.

For the sake of clarity, the following terms have the meaning ascribed to them:

Non-video content—content delivered to a subscriber via CPE other than a device primarily configured to provide video content to a television or television monitor.

Video content—content delivered to a subscriber via CPE primarily configured to provide video content to a television or television monitor.

Video content segment—an identifiable unit of video content.

Browsing data—information relating to websites visited by users of a computing device connected to the Internet via a network interface device provided by the multi-platform service provider.

Viewing data—information relating to video content viewed by a subscriber, including the viewing history, viewing behavior, and viewing context of the subscriber.

Service recipient—recipients of services associated with a subscriber account.

Telephone calling data—information relating to calls placed to telephone numbers over facilities provided by the multi-platform service provider.

FIG. 1 illustrates a cross-platform advertisement delivery system 100 for use by a multi-platform system operator. For example, the advertisement delivery system may be located within a headend of a cable network (not illustrated) or in a remote location accessible to the headend. However, this is not meant as a limitation. The multi-platform service provider may be a cable network operator, a fiber network operator, or a wireless network operator.

In the illustrated embodiment, a multi-platform service provider provides multiple services such as video services, high speed data services, including Internet connectivity services, and telephone services to a subscriber. A correlation processor 102 may receive user data from a viewing datastore 120, a browsing datastore 124, and/or a telephone calling datastore 128. The correlation processor 102 utilizes correlation software 104 to create a profile associated with a subscriber account and store the profile in profile datastore 106. The profile for a subscriber account may also include user profiles that are deduced from patterns in the viewing data, the browsing data and/or the telephone calling data indicative of the interests of separate users. Correlation processor 102 may also draw upon subscriber billing information, demographic information, and any other identification technique used to generate a profile of a subscriber or group of subscribers.

A video content selection monitor 140 provides real time video content selection data to an ad selection server 108. The ad selection server 108 may utilize any of the current video content selection data, the subscriber account profiles and the user profiles to select ads to be conveyed to a particular device by ad delivery server 110.

Correlation processor 102 may receive viewing data from viewing datastore 120. These data may include:

(a) the MAC address or other unique identifier associated with the CPE;
(b) the length of time a video content segment was displayed;
(c) whether the video content segment was watched to completion;
(d) a video content segment content type, as for example, an advertisement, a drama, documentary, a comedy, a news program, a gaming program, a sports program, or a viewable overlay;
(e) a video content segment content classifier, as for example, romance, mystery, true-crime, nature, baseball, football, basketball, soccer, boxing, horse racing, NASCAR, or cricket;
(f) an intended audience classifier, as for example, children, family, or adult;
(g) the number of times the same video content segment is displayed on the CPE over a period of time;
(h) the video content segment title (if applicable);
(i) video content segment metadata (i.e., particular actors, themes, plots, etc.); and
(j) trick play used during the video content segment viewing.

Where the multi-platform service provider is a cable service provider, the CPE may be a standalone set top box (STB). However this is not meant as a limitation. For example, a CPE performing the communication functions of an STB may be incorporated into a cable-ready television with the security and access functions performed by an external PCMCIA type card. See, OpenCable™ Multistream CableCARD Interface Specification OC-SP-MC-IF-I02-040831. CPE may also be a system including a modem, processor, memory, and display (i.e., a personal computer) which is able to retrieve, process, and display video content.

Viewing data may be gathered only for video content segments delivered to a CPE for a minimum viewing time. In this way, channel surfing does not produce excess viewing data.

The correlation processor 102 may receive browsing data from browsing datastore 124. Browsing data provide statistics of websites visited by users of a computing device connected to the Internet via a network interface device provided by the multi-platform service provider.

For each such website, these data may include:

(a) the MAC address or other unique identifier associated with the network interface device;
(b) the MAC address or other unique identifier associated with the computing device connected to the network interface device;
(c) the URL of the website;
(d) the URL of the pages on the website visited by the subscriber;
(e) a website content type, as for example, webstore, information provider, or search engine;
(f) a web page content classifier. The web page content classifier for a webstore may include the type of goods viewed, as for example, books, music, electronics and a sub-classifier indicative of a type of book, music or electronic device viewed on the computing device. The web page content classifier for an information provider may include the type of information provided by the site, as for example, medical, health, infant care, or dietary information. The web page content classifier for a search engine may include the search terms entered into the search engine; and
(g) the number of times the same web site and web pages have been visited by the computing device.

A computing device may be a desktop or laptop computer, a web-enabled personal digital assistant, and a web-enabled cell phone.

The correlation processor 102 may receive telephone calling data from telephone calling datastore 124. Telephone calling data provide statistics of calls placed to telephone numbers over facilities provided by the multi-platform service provider. For each such telephone number, these data may include:

(a) the telephone number of the calling party;
(b) the telephone number of the called party;
(c) a business classifier relating to the called party telephone number, as for example, a food service, an insurance provider, a car dealership, a garden supply company, a hardware store, and an electronics store; and
(d) the number of times the telephone number was called;
(e) the geographic region of the called party which may be derived from an area or country code;
(f) if the called party is a subscriber of the MSO, their profile information.

The correlation processor 102 utilizes correlation software 104 to identify patterns in the viewing data, the browsing data and/or the telephone calling data indicative of the interests of recipients of services associated with a subscriber account (herein, "service recipients"). These interests are reflected in a subscriber account profile.

In one implementation of a multi-platform advertising system, correlation software 104 weighs user data from at least two sources to establish a profile entry for a subscriber account profile indicative of actual user interest. For example, the subscriber account profile would include a "sports" entry if the viewing data and either the browsing data or the telephone call data also reflect an interest in sports. If an interest in sports is confirmed, the viewing data, the browsing data, and/or the telephone call data may be utilized to identify particular sports of interest to the service recipients associated with the subscriber account.

A profile stored in profile datastore 106 identifies the interests of service recipients associated with a subscriber account based on the user data processed by correlation software 104. In one implementation of a multi-platform advertising system, the interests of the service recipients are assigned an interest factor and an interest velocity factor. The interest factor measures the overall interest of a particular profile category relative to all other profile categories of the subscriber account profile weighted by the number of user data points obtained from collective usage data of the service recipients. The interest velocity factor measures the interest of the service recipients at a point in time. For example, an interest factor for a subscriber account profile may reflect a relatively low interest in sports. The velocity factor may reveal that just before the Super Bowl or the NCAA basketball tournament, the interest of the service recipients in sports increases dramatically. Using these factors can thus allow sports-related ads to be selected and delivered to the subscriber's household when the interest in sports is at its highest.

In one implementation of a multi-platform advertising system, the correlation software 104 identifies patterns in the viewing data, the browsing data and/or the telephone calling data indicative of the interests of distinct users. The usage patterns may be used to predict when a particular service recipient may be utilizing a particular network device associated with a subscriber account and connected to the network of the multi-platform service provider. For example, for a subscriber account having two computers and a single CPE, a usage pattern may detect a strong interest in sports and in nature programs. The browsing data for one computer may indicate an interest in sports while the browsing data for the other computer may indicate little or no interest in sports. Under these circumstances, the correlation software 104 may deduce that there are two distinct users and create a profile for each user. If the two computers are each configured with a separate e-mail client, the e-mail account information may be used to further identify a user, associate that user with a user profile, and associate that user with a particular computer.

Under circumstances in which a subscriber account profile includes user profiles, the ad selection processor 108 may use the real time video content selection data provided by video content selection monitor 140 to assume which user is currently viewing a particular video content segment and to provide an advertisement that is of interest to that assumed user.

In another embodiment, the correlation software 104 identifies patterns in the viewing data, the browsing data and/or the telephone calling data indicative of the interests of a first subscriber and the ad selection processor 108 to provide an advertisement to a second unrelated subscriber that has a profile similar to that of the first subscriber.

Selected advertisements may be delivered to a CPE, a computing device, and/or a telephone. Ad delivery processor 110 is connected to both a high speed data interface and a video distribution interface. An advertisement that is selected for delivery to a computing device or a telephone is sent by ad delivery processor 110 to the high speed data interface. For example, an advertisement may be sent to a computing device as a web page, an instant message, or an e-mail. An advertisement may be played over a digital telephone when the telephone goes off-hook. The delivery of advertisements to their final destination may be accomplished by various means known in the art. See, for example, commonly owned U.S. Pat. No. 7,111,314 issued to Urdang et al. on Sep. 19, 2006, which patent is incorporated herein by reference for all purposes.

An advertisement that is selected for delivery to a particular CPE is sent by ad delivery processor 110 to a video distribution interface. An advertisement selected for display on a particular CPE may be inserted into the video stream, stored locally on the CPE for insertion using a triggering protocol, or may be provided interactively to a subscriber by displaying viewer-selectable icons or cues during the presentation of a video content segment.

FIG. 2 illustrates a process using a cross-platform advertisement delivery system according to an embodiment hereof.

User data from a viewing datastore, a browsing datastore, and/or a telephone calling datastore are received at a correlation processor 200.

Patterns in the viewing data, browsing data and telephone calling data indicative of the interests of a service recipient are identified using correlation software 205. These interests are reflected in a subscriber account profile.

A profile associated with a subscriber account is created from the user data and stored in a profile datastore 210. The profile for a subscriber account may also include user profiles that are deduced from patterns in the viewing data, browsing data and/or telephone calling data indicative of the interests of separate users. In addition to user data, a profile may reflect subscriber billing information, demographic information, and other identification techniques used to generate a profile of a subscriber or group of subscribers.

Real time video content selection data is received 215. An advertisement is selected 220 using the real time video content selection data and a subscriber account profile. The advertisement is delivered to a selected CPE, such as a set-top box, a computing device, or a telephone 225.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A cross-platform advertisement delivery system comprising:
   a correlation processor, wherein the correlation processor is configured with software executable instructions to cause the correlation processor to perform operations comprising:
      receiving content data, wherein the content data is indicative of content received by one or more devices associated with a subscriber account;
      processing the content data to determine one or more interest factors, wherein an interest factor is a measure of a level of interest in a subject of interest relative to all other subjects of interest;
      processing the content data to determine an interest velocity factor for each of the subjects of interest, wherein the interest velocity factor is a measure of a rate of change of interest in the subject of interest at a point in time; and
   an advertisement selection processor, wherein the advertisement selection processor is configured with software executable instructions to cause the advertisement selection processor to perform operations comprising:
      selecting an ad for delivery to at least one of the one or more devices associated with the subscriber account, wherein the selection is made using the interest factor; and
      selecting a different ad for delivery to the at least one of the one or more devices associated with the subscriber account when the velocity factor exceeds a threshold value.

2. The system of claim 1, wherein the advertisement is delivered as video content or as non-video content.

3. The system of claim 1,
wherein the content data comprises at least one of first data and second data;
wherein the first data comprises information indicative of video content received by a video termination device via a video network segment, wherein the video termination device is associated with a subscriber account; and
wherein the second data comprises information indicative of non-video content received by one or more other devices connected to a data network segment via a data interface device and wherein the one or more other devices are associated with the subscriber account.

4. The system of claim 3, wherein the first data is selected from the group consisting of a MAC address or other unique identifier associated with a video termination device, a length of time a segment of video content was displayed, a measure indicative of whether the video content segment was watched to completion, a video content segment content type, a video content segment content classifier, an intended audience classifier, a measure indicative of a number of times the same video content segment was displayed on a video termination device over a period of time, a video content segment title, a video content segment metadata, and a measure indicative of whether a trick play was used during the video content segment viewing.

5. The system of claim 4, wherein a video content segment content type is selected from the group consisting of an advertisement, a drama, documentary, a comedy, a news program, a gaming program, a sports program, or a viewable overlay.

6. The system of claim 4, wherein the video content segment content classifier is selected from the group consisting of romance, mystery, true-crime, nature, baseball, football, basketball, soccer, boxing, horseracing, NASCAR, and cricket.

7. The system of claim 4, wherein the intended audience classifier is selected from the group consisting of children, family, and adult.

8. The system of claim 4, wherein the video content segment metadata is selected from the group consisting of actors, themes, and plots.

9. The system of claim 3, wherein the advertisement selection processor further comprises instructions for selecting a targeted device from the one or more other devices associated with the subscriber account to receive the advertisement and wherein the advertisement delivery processor further comprises instructions for delivering the advertisement in a format compatible with the targeted device.

10. The system of claim 3, wherein one or more other devices are computing devices that are connected to the data network segment via the data interface device, wherein the second data comprises information indicative of downloaded web pages received by a computing device, and wherein the information indicative of downloaded web pages received by the computing device is selected from the group consisting of a unique identifier associated with the network interface device, a unique identifier associated with a computing device connected to the data interface device, a URL of a website where a downloaded web page is located, a URL of web pages on a website visited by the subscriber, a measure indicative of a website content type, and a web page content classifier indicative of a type of goods viewed.

11. The system of claim 10, wherein the measure indicative of a website content type is selected from the group consisting of a webstore, an information provider, and a search engine.

12. The system of claim 11, wherein the web page classifier is selected from the group consisting of a type of goods viewed, a type of information provided on the webpage, and a search term entered into a search engine.

13. The system of claim 3, wherein the one or more other devices are telephone devices that are connected to the data network segment via the data interface device, wherein the second data comprises information indicative of telephone calling data received by a telephone device, and wherein the information indicative of telephone calling data received by the telephone device is selected from the group consisting of a telephone number of a calling party, a telephone number of a called party, a business classifier indicative of the telephone number of a called party, a number of times a telephone number of a called party was called, a geographic region of a called party, and profile information of a called party.

14. The system of claim 13, wherein the business classifier is selected from the group consisting of a food service, an insurance provider, a car dealership, a garden supply company, a hardware store, and an electronics store.

15. The system of claim 3, wherein the video termination device is selected from the group consisting of a standalone set top box (STB) and an STB incorporated into a cable-ready television.

16. A method for delivering advertisements in a multi-platform network comprising:
receiving at a correlation processor content data, wherein the content data is indicative of content received by one or more devices associated with a subscriber account;
processing, using the correlation processor, the content data to determine one or more interest factors, wherein an interest factor is a measure of a level of interest in a subject of interest relative to all other subjects of interest;
processing, using the correlation processor, the content data to determine an interest velocity factor for each of the subjects of interest, wherein the interest velocity factor is a measure of a rate of change of interest in the subject of interest at a point in time;
selecting, using the advertisement selection processor, an ad for delivery to at least one of the one or more devices associated with the subscriber account, wherein the selection is made using the interest factor; and
selecting, using the advertisement selection processor, a different ad for delivery to the at least one of the one or more devices associated with the subscriber account when the velocity factor exceeds a threshold value.

17. The method of claim 16, wherein the advertisement is delivered as video content or as non-video content.

18. The method of claim 16,
wherein the content data comprises at least one of first data and second data;
wherein the first data comprises information indicative of video content received by a video termination device via a video network segment, wherein the video termination device is associated with a subscriber account; and
wherein the second data comprises information indicative of non-video content received by one or more other devices connected to a data network segment via a data interface device and wherein the one or more other devices are associated with the subscriber account.

19. The method of claim 18, wherein the first data is selected from the group consisting of a MAC address or other unique identifier associated with a video termination device, a length of time a segment of video content was displayed, a measure indicative of whether the video content segment was watched to completion, a video content segment content type, a video content segment content classifier, an intended audience classifier, a measure indicative of a number of times the same video content segment was displayed on a video termination device over a period of time, a video content segment title, a video content segment metadata, and a measure indicative of whether a trick play was used during the video content segment viewing.

20. The method of claim 18, wherein a video content segment content type is selected from the group consisting of an advertisement, a drama, documentary, a comedy, a news program, a gaming program, a sports program, or a viewable overlay.

21. The method of claim 18, wherein the video content segment content classifier is selected from the group consisting of romance, mystery, true-crime, nature, baseball, football, basketball, soccer, boxing, horseracing, NASCAR, and cricket.

22. The method of claim 18, wherein the intended audience classifier is selected from the group consisting of children, family, and adult.

23. The method of claim 18, wherein the video content segment metadata is selected from the group consisting of actors, themes, and plots.

24. The method of claim 18, further comprising:
selecting a targeted device from the one or more other devices associated with the subscriber account to receive the advertisement using the selection server; and
delivering the advertisement in a format compatible with the targeted device using the advertisement delivery server.

25. The method of claim 18, wherein one or more other devices are computing devices that are connected to the data network segment via the data interface device, wherein the second data comprises information indicative of downloaded web pages received by a computing device, and wherein the information indicative of downloaded web pages received by the computing device is selected from the group consisting of a unique identifier associated with the network interface device, a unique identifier associated with a computing device connected to the data interface device, a URL of a website where a downloaded web page is located, a URL of web pages on a website visited by the subscriber, a measure indicative of a website content type, and a web page content classifier indicative of a type of goods viewed.

26. The method of claim 25, wherein the measure indicative of a website content type is selected from the group consisting of a webstore, an information provider, and a search engine.

27. The method of claim 26, wherein the web page classifier is selected from the group consisting of a type of goods viewed, a type of information provided on the webpage, and a search term entered into a search engine.

28. The method of claim 18, wherein the one or more other devices are telephone devices that are connected to the data network segment via the data interface device, wherein the second data comprises information indicative of telephone calling data received by a telephone device selected from the group consisting of a telephone number of a calling party, a telephone number of a called party, a business classifier indicative of the telephone number of a called party, a number of times a telephone number of a called party was called, a geographic region of a called party, and profile information of a called party.

29. The method of claim 28, wherein the business classifier is selected from the group consisting of a food service, an insurance provider, a car dealership, a garden supply company, a hardware store, and an electronics store.

30. The method of claim 18, wherein the video termination device is selected from the group consisting of a standalone set top box (STB) and an STB incorporated into a cable-ready television, and a personal computer.

31. A cross-platform advertisement delivery system comprising:
a correlation processor, wherein the correlation processor is configured with software executable instructions to cause the correlation processor to perform operations comprising:
receiving first data, wherein the first data comprises information indicative of video content received by a video termination device via a video network segment, wherein the video termination device is associated with a subscriber account;
receiving second data, wherein the second data comprises information indicative of non-video content received by one or more other devices connected to a data network segment via a data interface device and wherein the one or more other devices are associated with the subscriber account;
processing the first data and the second data to determine one or more interest factors, wherein an interest factor is a measure of a level of interest in a subject of interest relative to all other subjects of interest; and
processing the first data and the second data to determine an interest velocity factor for each of the subjects of interest, wherein the interest velocity factor is a measure of a rate of change of interest in the subject of interest at a point in time; and
an advertisement selection processor, wherein the advertisement selection processor is configured with software executable instructions to cause the advertisement selection processor to perform operations comprising:
selecting an advertisement, wherein the selection is made using the interest factor; and
selecting a different advertisement when the velocity factor exceeds a threshold value; and
an advertisement delivery processor, wherein the advertisement delivery processor is configured with software executable instructions to cause the advertisement delivery processor to perform operations comprising delivering the selected advertisement or the different advertisement to the subscriber as video content or as non-video content to at least one of the one or more other devices connected to the data network segment.

32. The system of claim 1, wherein the instruction for processing the content data to determine one or more interest factors comprises determining an interest factor in a subject of interest when the subject of interest is indicated in the content data from at least two of the one or more devices.

33. The method of claim 16, wherein processing the content data to determine one or more interest factors comprises determining an interest factor in a subject of interest when the subject of interest is indicated in the content data from at least two of the one or more devices.

* * * * *